March 3, 1970     L. R. SPERBERG     3,498,355
TIRE HAVING PLIES MADE OF RAYON, POLYESTER,
POLYETHYLENE, AND POLYAMIDE
Filed July 9, 1968

*INVENTOR.*
LAWRENCE R. SPERBERG
BY
MARCUS L. BATES

United States Patent Office 3,498,355
Patented Mar. 3, 1970

3,498,355
TIRE HAVING PLIES MADE OF RAYON, POLYESTER, POLYETHYLENE, AND POLYAMIDE
Lawrence R. Sperberg, 6740 Fiesta Drive,
El Paso, Tex. 79912
Filed July 9, 1968, Ser. No. 743,501
Int. Cl. B60c 9/14
U.S. Cl. 152—354                                   7 Claims

ABSTRACT OF THE DISCLOSURE

A biased constructed tire which uses a high impact energy moisture resistant cord, such as nylon, in the outer ply and a low growth heat resistant material, such as rayon, in the inner ply, with polyester or polyethylene being used as the tire cord material in the plies located between the nylon and rayon plies.

CROSS-REFERENCE TO RELATED PATENT APPLICATION

Ser. No. 504,768; filed Oct. 24, 1965; entitled "Bias Constructed Truck Tires"; now Patent No. 3,397,729, issued Aug. 20, 1968.

BACKGROUND OF THE INVENTION

Nylon, as used herein, relates to a synthetic textile comprised of a polyamide resin. Rayon relates to a synthetic textile comprised of a modified cellulose filament, including the E.H.M. (extra high modulus) material as well as Tyrex.

Nylon has gradually replaced rayon as the principal tire cord in the field of vehicle tires. Several years accumulated data of road test results using truck tires that were fabricated with nylon cords show failure patterns unlike any that were associated with previous tests of rayon tire cords.

The failure of nylon truck tire cords may be attributed to nylon fusion. Test data show conclusively that this fusion of the nylon cord is a direct result of the intense heat build-up on the inside of the tire. In a truck tire the presence of nylon fusion is especially of interest since a truck tire is normally subject to more severe usage than is a passenger or automotive tire, consequently, nylon fusion is more prominent in the truck tire industry, and it is assuming the stature of a major problem in passenger tires because of the many law suits filed wherein said delitescent defect is a major cause of failure.

The problem of nylon fusion is particularly dangerous in addition to being expensive for the fusion cannot be detected by one unskilled in the art since close examination of the tire interior is required to detect the beginning of the fusion process. Usually the occurrence of nylon fusion, or at least the effect thereof, is realized when the tire explodes. The problem is well hidden for it required several hundred attempts by patentee in a carefully controlled test program to discover the reason for this phenomenon. The problem is becoming acute and is beginning to be recognized as the source of great loss of life and property, for one may be driving along at a low rate of speed in close proximity to pedestrians and experience a violent tire explosion. This explosion may occur at any speed, after any length of driving, under almost any severity of driving conditions.

There is an area in the shoulder of a truck tire where a maximum amount of bending or flexing takes place. This area may be very narrow or sharp, depending upon the design and construction features of the tire. In a well designed tire, this area of maximum flexing is spread over a greater width than a tire of inferior construction. In nylon tires, discoloration on the interior of the tire develops along this area of maximum flexing. The intensity of the heat-build-up and the sharpness of the flex line control the appearance of the discoloration or heat band which may vary in appearance from a light reddish brown to nearly black and vary in which from one half to three inches or more. In a well designed tire, heat bands may not appear or if they do appear they may be relatively broad and indistinct. In better designed tires the heat bands are very broad and have indistinct edges and in some instances the two heat bands may actually grow so broad as to unite in the tire crown, forming a continuous discolored area extending from shoulder to shoulder of the tire. In a poorly designed tire these heat bands may be concentrated in a pair of continuous narrow bands which seem to indicate a more intense condition of nylon fusion that will accordingly bring about a more rapid failure. In the field of truck tires very few nylon tires fail to develop heat bands. In the field of passenger tires only a moderately few tires actually develop inside heat bands.

A nylon tire which indicates excessive heat build-up by the above mentioned heat bands is in a state of advanced deterioration since the nylon cord has undergone some degree of chemical or physical change. Such a tire may continue to run some indeterminable period, but it is only a matter of time until it will explode. Should the heat bands appear late in the tread life, so as to enable the tire to live to be recapped, such a tire would in all probability fail prior to the time at which it might be anticipated to wear out.

Nylon fusion may be attributed to any combination of several factors that result in a change in the cord, as a consequence of long time exposure to temperatures generated by the running tire. One, the nylon cord can be undergoing both a chemical and physical change. Two, the dip coat that acts as the bond between the nylon filaments and the rubber skim compound can be undergoing such a change. Or, three, the rubber compound adjacent to the individual cords can be undergoing a selective aging process that results in a hardening of the compound. Any combination of these factors is termed nylon fusion. It is known that the nylon cord on the leading edge of the biased cord loses half its tensile strength under some conditions of service which loss may also be a manifestation of the fusion process.

It is evident that the focal point of attack along the flex line starts with the inside ply of a tire and that this failure progresses outward through the tire, that is, towards the ply adjacent the tread. Once the attack starts, it proceeds at an increasingly rapid rate until the internal pressure exceeds the external strength of the tire, whereupon the tire explodes without warning, dismembering the tire along the flex line heat band. The nylon apparently loses a large portion of its strength in the inside ply with each successive ply losing a little less strength as the deterioration progresses from the inside to the outside of the tire.

Rayon truck tires have not had the type failures that are characteristic of nylon tires. Tests show that rayon suffers only a slight loss in tensile strength after running 100,000 miles or more, when properly protected, even though the decomposition temperature of rayon is well below the melting point of nylon. The phenomenon of nylon fusion has not found its counterpart in the cords of rayon plies. On the contrary, rayon tires generally fail from the outside. Rayon tires are susceptible to deterioration caused by moisture absorption, whereas nylon appears impervious to moisture. Wet rayon loses up to 70% of its dry strength, and as cracks appear, rayon absorbs moisture allowing further cracking and deterioration which results in loss of tensile strength with possible destruction of the tire. The deleterious and delitescent effect of fusion, change of cord dip chemical, and aging of adjacent rubber compound is not as evident in the rayon tire as in the nylon tire since patentee has found no evidence of the tell-tale heat bands in the rayon tires.

In light of the above problems associated with fusion and moisture deterioration, it appears obvious that both the nylon and rayon tire is not the panacea, although each embraces desirable qualities, in the tire field.

It is an object of this invention to provide a vehicle tire having the desirable performance of nylon cords while avoiding the problems associated with nylon fusion.

Another object of this invention is to provide a superior tire that is capable of withstanding the temperature levels and stresses encountered under severe driving conditions.

A further object of this invention is to provide a tire construction having improved traction, reasonably low permanent set, and high resistance to cracking.

Still another object of this invention is to provide an improved bias constructed tire in which a high energy impact resistant cord having low bending stiffness and high bending life coupled with excellent resistance to moisture deterioration is used as the principal outside ply cord material. Polyamide exemplifies this material. Rayon, certain polyesters, and fiberglass possesses superior resistance to deterioration when exposed to heat for long periods of time and accordingly, are used as the principal inside cord material.

An additional object of this invention is to set forth a novel two ply tire utilizing the novel principles of construction outlined herein; and Other objects of this invention will become apparent to those skilled in the art from the following remaining disclosure.

Figure 1:
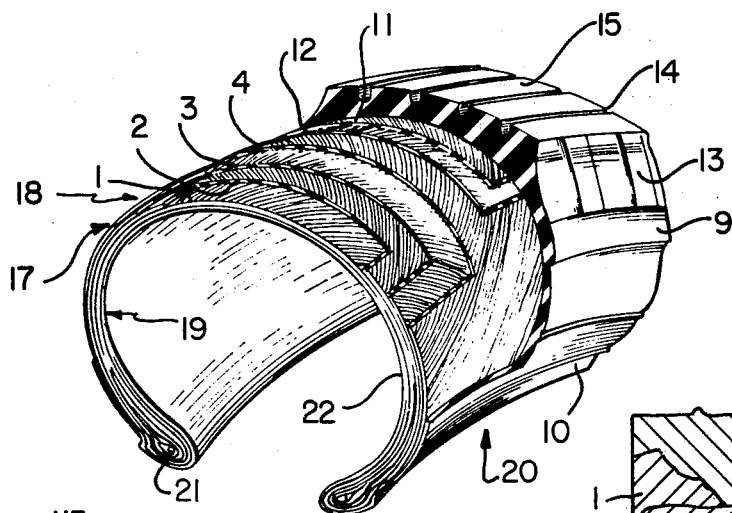
FIGURE 1 shows a conventional four ply tire construction with parts broken away for clarity.

Referring to the drawing, and particularly to FIGURE 1, reference numeral 1 indicates the inner or first ply of a biased constructed tire having adjacent plies 2, 3, and 4, the fourth ply being adjacent to the tread. Numeral 9 indicates the buffing or scuff rib and numeral 10 the mounting guide rib. The first and second breaker plies or strips are represented by numerals 11 and 12. The breaker strips 11 and 12 are found only in exceptionally heavy duty passenger tires and are not usually fabricated into the ordinary vehicle passenger tire. These breakers 11 and 12 provide a means of increasing the ply rating of a tire.

The buttress of the tire is seen at 13. The tread ribs 15 are separated by tread grooves 14. Arrows at numerals 17 and 18 indicate the tire flexing region. The area between arrows 17 and 19 indicate the tire body. The bead wire is shown at 21, and 22 is the inner liner compound.

Figure 2:
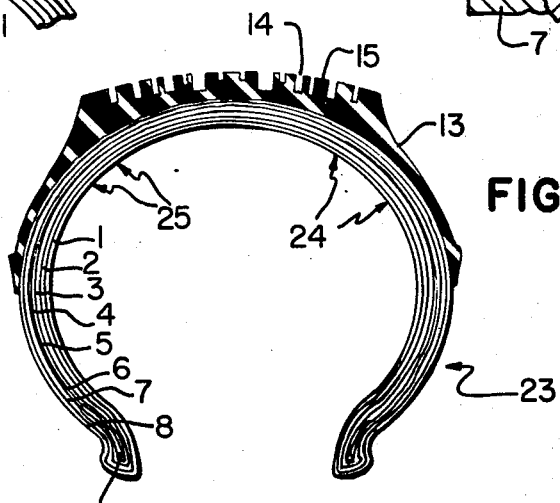
FIGURE 2 shows a section of a conventional truck tire having eight plies.

Looking now to FIGURE 2, wherein like numerals are used to indicate like elements, there is seen a conventional bias constructed truck tire 23 having eight plies represented by numerals 1 through 8 wherein numeral 1 is the first or inner ply and numeral 8 is the last or outside ply adjacent the tread. Numerals 24 and 25 indicate the area where discoloration may first appear on the inside ply of the tire.

Figure 3:
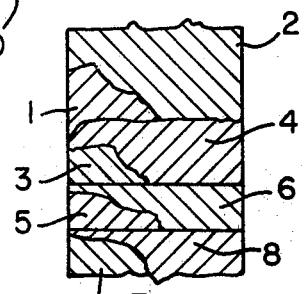
FIGURE 3 is a diagrammatical plan view, with certain parts broken away, and taken from the top of a tire such as seen in FIGURE 2.

In FIGURE 3, the innermost ply 1 corresponds to the innermost ply 1 of FIGURE 1, and as further seen in FIGURE 3 there are three pairs of oppositely biased plies, that is, ply pairs 1 and 2, 3 and 4, 5 and 6. Where deemed desirable, a breaker can be arranged circumferentially about the outermost ply 8 in a manner as seen at 11 and 12 in FIGURE 1, as is known to those skilled in the art.

Figure 4:
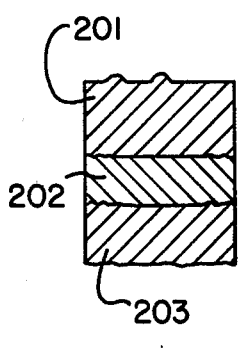
FIGURE 4 is a diagrammatical plan view similar to FIGURE 3.

FIGURE 4 sets forth a three ply tire having an innermost ply 201 and an outermost ply 203. For purposes of illustration the plies are of biased construction. Where deemed desirable a breaker can be included in the construction in the illustrated manner of FIGURES 1 and 5.

Figure 5:
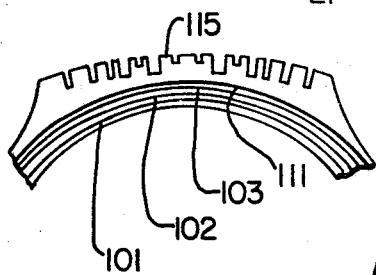
FIGURE 5 is a diagrammatic sectional view of part of a tire provided with carcass plies arranged according to one embodiment of the invention.

FIGURE 5 is a diagrammatic sectional view of part of a tire which includes plies 101, 102, 103 and breaker ply 111. A tread wearing composition is seen at 115. The indicated ply and breaker arrangement can be oppositely biased pairs of plies as seen in FIGURE 4.

A structurally perfect tire, so far as concerns the tire cord textile, is deemed one that has low elongation under load, excellent adhesive power, high impact energy, excellent bending life, low bending stiffness, low heat growth, high moisture resistance, and low tendency towards fusion. No known material exhibits all of these desirable properties; however, applicant has devised a novel construction which will enable fabrication of a tire that, as an end result, embraces these heretofore unattainable attributes.

Of the known tire cord materials, steel, rayon, including the extra high modulus rayon; fiber-glass, polyesters, and the polyamides (nylon 6 and 66) have achieved the most prominence. Applicant's novel tire construction employs a combination of these known textiles in a novel arrangement wherein their outstanding properties are utilized while their poor or mediocre properties are minimized or hidden. This novel tire construction places the materials having high impact energy, high elongation, high adhesive power, long or high bending life, low bending stiffness, poor fusion characteristics, and high moisture resistance in the outer plies; and places the materials having the low moisture resistance, high fusion resistance characteristics and low elongation under loads on the inside plies; with materials having properties or characteristics intermediate of these two extremities being placed in the center or between the inner and outer plies.

Of the above materials, the polyamides are best suited for the outside ply material since its bending life far exceeds the others, and its impact energy and moisture resistance is highly satisfactory; hence, nylon is used in the below illustrative examples to exemplify an outside ply material having the above outlined desirable properties.

The rubber industry recognizes glass fiber as an interesting and potentially valuable reinforcing textile for tires. While the fiber suffers interfilament chafing failures and fiber-to-rubber adhesion failure during flexing, the advantages of great strength, resistance to stretch growth, retention of strength above 450° F., non-flammability and chemical inertness tend to off-set the undesirable features of low impact energy and lower bending life. Glass cord is only slightly more extensible than steel while weighing only one-third as much as steel. The problem of chafing failures and fiber-to-rubber adhesion failures during flexing have been partially overcome recently by chemically bonding the individual filaments of glass to the rubber.

Polyolefins and polyesters, as reinforcing textiles, offer low cost, good moisture resistance, high strength, and good fatigue resistance material to the tire carcass. All of the polyolefins, except for polypropylene, have high melting points approaching that of nylon while polyester exceeds the melting point of nylon. Adhesion failures, such as found in fiber-glass, is one of the undesirable features associated with these two textiles.

Rayon, and the extra high modulus rayon, for some reason are essentially impervious to the fusion process. Fiber-glass and steel also exhibit resistance to the fusion process. Steel and fiber-glass exhibit very poor adhesive power, and a low bending life; hence, these materials of construction are best suited for the inside plies where they are protected from the detrimental effects associated with the outside ply location. Rayon is used in the below examples as being an exemplification of the materials of construction suitable for the inside plies.

Ordinary rayon, polyester, and the polyolefins fall in between the properties outlined above for the inner and outer plies, and hence find utility as the plies adjoining either of the above materials, or the central plies.

In this respect, it should be noted that the requirement for low elongation in the outer ply material is not deemed of prime importance in this novel construction. While this is a departure from the present accepted tire manufacturing technique, it is nevertheless considered of secondary importance in the selection of an outer ply material since the outside ply can grow no more than is permitted by the growth of the inside ply material; hence, the requirement of low elongation or low growth rate is shifted to the inside ply which results in a lowering of the criticality of elongation of the outer plies.

Improved resistance to separation and resistance to groove cracking are obtained by using a material having low growth properties on the inside plies, simply by the expedient of controlling or restricting tire growth.

Since nylon resists the effects of moisture and shock while rayon, polyester, and fiber-glass resists the effects of high temperature, the present novel tire is constructed using rayon, polyester, or fiber-glass cord on the inside plies and using nylon cord on the exterior plies. This results in a much superior tire than one constructed entirely of the above mentioned synthetic cord. The prime advantages of the present novel tire is that the heat resistant inner plies are protected against the effects of moisture and shock by the outside nylon plies, while the moisture resistant shock resistant nylon is protected from the high temperatures associated with the inside plies.

It should be understood that the overall characteristics of the tire construction using a multi-ply configuration will be related to and governed by the relative number of growth and fusion resistant rayon plies used on the inner plies as compared to the number of moisture resistant, high impact energy nylon plies used in the outer plies including the breaker ply. The relationship of these elements must be of a ratio to first overcome the problem of nylon fusion, followed by the desirability of low permanent set and the overall ply rating. Thus it is evident that a tire can be fabricated having a minimum of four plies and up to as many as fourteen plies with or without breakers to give a strength equivalent to as many plies as desired. In some aircraft tires the number of plies may even exceed this number.

In the instant novel bias constructed truck tire, as in all bias constructed tires, the adjacent plies run transverse to each other, noting for example FIGURE 1 wherein ply 1 compared to ply 2 is adjacently and transversely related to each other. Hence, in a properly designed tire, each pair of adjacent oppositely biased plies should be of like material since the stresses of the plies on each side of the complete tire structure may otherwise be unequal. In a four ply automotive or truck tire, the two adjacent outer plies 3 and 4 are accordingly fabricated of nylon cord for example, while the two adjacent oppositely biased inner plies 1 and 2 are fabricated from either rayon, polyester, or fiber-glass. Thus the latter three textiles replace the nylon in an area which is the first to develop signs of heat bands. In the instant invention, the nylon plies 3 and 4 are placed in an area where they will not be subjected to the effects that cause the fusion process, and at the same time provide the rayon, polyester, or fiber-glass with a moisture barrier and from high impact loads. Thus each material is advantageously placed so as to utilize the outstanding properties of the material and so as to minimize the poor properties of the materials. In effect, then, the nylon is a moisture and impact barrier to the rayon, polyester, and fiber-glass which in turn serve as a heat barrier to the nylon.

Considering now the eight ply truck tire of FIGURE 2, there is seen four sets of pairs of plies in the biased constructed tire. The adjacent plies are considered in pairs since any two adjacent plies are oppositely biased, and to obtain a structurally balanced tire each side of the tire must be symmetrically balanced modulus wise. That is, the same forces must be present in each side of the tire, hence two adjacent oppositely biased plies fabricated from identical or closely matched material will provide a tire with symmetrically balanced forces. The instant eight ply tire is therefore advantageously divided into four pairs of plies, with plies 1 and 2 forming the first pair, plies 3 and 4 the next pair, plies 5 and 6 the third pair, and plies 7 and 8 the last or fourth pair of plies.

Nylon, being highly resistant to deterioriation from moisture and having the ability to withstand high impact loads, is advantageously used as the cord fiber in the last pair of plies, number 7 and 8 adjacent the tread.

Fiber-glass may be alternatively used as the reinforcing textile in the two adjacent plies furthermost removed from the tread in the flex area where nylon fusion is ordinarily first observed. The excellent ability of fiber-glass to withstand high temperatures makes this choice of textile ideal for the innermost plies numbers 1 and 2 since the remaining plies will protect the glass fibers from high impact stresses. In such a construction, the central plies preferably are of rayon since this material, although unable to withstand the high temperatures as well as the polyesters and polyolefins (except for polypropylene), exhibits greater ability to withstand flexing when properly protected against climatic conditions than do the polyesters and polyolefins.

Five examples of truck tire manufacture:

Example one: A truck tire having eight plies as in FIGURE 2 was designed using nylon cord fiber in the four plies designated by numbers 5, 6, 7, and 8. The next adjacent two plies number 4 and 3 were fabricated using rayon fiber as the principal reinforcing textile. Plies 1 and 2 were fabricated using a fiber-glass fabric having the individual glass filaments chemically bonded to the rubber in the ply.

The tire in example one carries fiber-glass at the focal point of heat build-up with rayon plies between the fiber-glass and nylon. The rayon plies are protected from external atmospheric conditions by the nylon while the nylon is at the same time removed from the area which is subjected to fusion. The superiority of this tire is attributed to the glass being amply protected from impact by the rayon and nylon plies so as to reduce chafing failures and fiber-to-rubber adhesion failures.

Example two: A tire was designed using polyester fabric as the reinforcing textile in plies number 3 through 6, FIGURE 2. The last two plies 7 and 8 were of nylon, as in example one, and the first two plies, numbers 1 and 2 were constructed of fiber-glass, as in example number one.

This tire utilized four plies of polyester since this textile is considered less efficient, as compared to rayon, in tolerating the effects of long time heat exposure as encountered in a running tire, while possessing other desirable properties intermediate between fiber-glass and nylon. Furthermore, the low elongation of polyester contributes toward a dimensionally stable tire.

Example three: A four ply truck tire having two breaker plies was constructed using a polyamide textile in the two breaker plies 11 and 12, FIGURE 1, and in the two plies 3 and 4 adjacent the breaker plies. The inside plies, 1 and 2, were fabricated from an extra high modulus rayon as ply number one of FIGURE 1, whose properties were selected to closely approximate a polyester which was used as the textile in ply number two. These two plies, 1 and 2, were carefully selected from different textile materials, yet the properties of these two materials were closely related so as to retain structural symmetry in ply 1 as compared to ply 2. The rayon versus polyester showed the following properties: elongation at 20% breaking load 0.7/1.0; impact energy 500/1800; bending life 1900/4200; heat growth 0.3/0.5. Thus while maintaining structural symmetry by adjacent cords having equal modulus heat growth characteristics, an overall improvement in impact energy resistance along with a much higher fatigue resistance has been accomplished by the use of the polyesters in ply number 2.

Example four: A polyolefin tire cord in lieu of the polyester cord was designed into the central plies numbers 3 through 6, FIGURE 2, as in the preceding example number two. Nylon was retained as plies numbers 7 and 8, and fiber-glass was retained as plies numbers 1 and 2, for substantially the same reasons as outlined above.

Example five: A two ply bias constructed tire having a pair of breaker plies was fabricated using nylon in both breaker plies, polyesters in the ply adjacent the breaker plies, and extra high modulus rayon as the inside ply textile material. The polyester and rayon properties were closely matched as in the preceding example.

Example six: A two ply bias constructed tire was designed having rayon in ply 1 and polyester in ply 2 so as to retain structural symmetry as regards cord modulus and heat growth while enhancing resistance to high energy impact, and imparting a higher flex life and a lower bending stiffness than would be realized using two plies of ordinary rayon.

It will be noted in the above examples that a high impact energy material having a high bending life along with excellent moisture resistance is always used in the ply adjacent the tire tread and that a material having high resistance to heat deterioration is always used in the plies furthest removed from the tire tread. There has previously been proposed a vehicle tire construction using nylon in the plies adjacent the tread with rayon fabric as the textile in the plies furthest removed from the tread. The present novel tire construction carries the process of eliminating nylon fusion a step further in order to give the maximum benefit of materials of construction presently available in the truck tire field.

It is considered within the comprehension of this invention to relocate the various textile materials with respect to each other, or, for that matter, to eliminate one of the ply textile materials so long as the concept of choosing the relative position of the ply material is carried out by the novel practice outlined herein. However, the novel solution to eliminating nylon tire explosions due to deterioration at the flex line, so as to avoid nylon fusion is best practiced from a consideration of the appended claims which are to be considered the metes and bounds of this invention.

I claim:
1. A pneumatic tire having a carcass built up of multiple bias constructed plies and including a ground contacting tread portion about the outer periphery of the carcass, with each said ply including a tire cord material comprised of a synthetic textile;
    the fiber in the ply furthest removed from the tread portion being made of rayon;
    the fiber in the ply nearest adjacent to the tread portion being made of polyamide; and
    the fiber in the ply located between the rayon and polyamide plies being made of a material selected from the group consisting of polyester and polyethylene.
2. The pneumatic tire of claim 1 wherein the tire cord material in the ply located between the rayon and polyamide plies are made of polyester.
3. The pneumatic tire of claim 1 wherein the tire cord material in the ply located between the rayon and polyamide plies is made of polyethylene.
4. The pneumatic tire as defined in any one of claims 1, 2, and 3 wherein the tire is a three ply tire with each ply being oppositely biased with respect to an adjacent ply.
5. The pneumatic tire as defined in any one of claim 2 or 3 and further including a breaker disposed about the outer peripheral surface of the outermost ply.
6. The pneumatic tire of claim 1 wherein the tire is a six ply tire, the first two plies being oppositely biased with respect to each other and being made of rayon, the next ply pair being oppositely biased with respect to each other and being made of polyethylene, and the remaining two plies being oppositely biased with respect to each other and made of polyamide.
7. The pneumatic tire of claim 1, wherein the structural properties of the material of each ply is selected so as to retain structural symmetry in one ply with respect to another of the remaining plies.

References Cited
UNITED STATES PATENTS 2,990,870    7/1961    Vittorelli _____ 152—356

FOREIGN PATENTS 700,790    12/1964    Canada.

ARTHUR L. LA POINT, Primary Examiner

C. B. LYON, Assistant Examiner

U.S. Cl. X.R.

152—357